(12) United States Patent
Jensen

(10) Patent No.: US 8,045,673 B2
(45) Date of Patent: Oct. 25, 2011

(54) CORE SPRAY SPARGER T-BOX CLAMP ASSEMBLIES AND METHODS OF USING THEREOF

(75) Inventor: Grant C Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 1039 days.

(21) Appl. No.: 11/878,496

(22) Filed: Jul. 25, 2007

(65) Prior Publication Data
US 2011/0235770 A1    Sep. 29, 2011

(51) Int. Cl.
*G21C 1/04* (2006.01)
(52) U.S. Cl. ......... 376/352; 376/204; 376/282; 376/292
(58) Field of Classification Search .................. 376/260, 376/352, 204, 282, 292
See application file for complete search history.

(56) References Cited

U.S. PATENT DOCUMENTS

| | | | |
|---|---|---|---|
| 2,469,111 A * | 5/1949 | Harding | 285/322 |
| 5,839,192 A * | 11/1998 | Weems et al. | 29/890.031 |
| 2006/0082139 A1 * | 4/2006 | Jensen | 285/192 |

* cited by examiner

*Primary Examiner* — Jack Keith
*Assistant Examiner* — Erin M Leach
(74) *Attorney, Agent, or Firm* — Harness, Dickey & Pierce

(57) ABSTRACT

Example embodiments are directed to core spray sparger T-box repairs, specifically, to universal core spray sparger T-box weldless clamps having remote-friendly operation and methods of using universal core spray sparger T-box weldless clamps. Example embodiment clamps may be secured without welding to a variety of upper and lower sparger T-box configurations. Example embodiment clamps may be configured to simultaneously engage a sparger T-box in multiple dimensions to allow a universal fit. Further, example embodiment clamps may be accessed, installed, or removed by interacting only with a front side of the example embodiment clamps, thus potentially reducing difficulty and cost in remote access repairs to example clamps.

20 Claims, 9 Drawing Sheets

CORE SPRAY SPARGER T-BOX CLAMP ASSEMBLIES AND METHODS OF USING THEREOF

BACKGROUND

1. Field

Example embodiments generally relate to Boiling Water Reactors (BWRs) and assemblies and methods for reinforcing piping for coolant spray within such reactors.

2. Description of Related Art

Generally, BWRs include a reactor core surrounded by a shroud and a shroud support structure. Piping typically penetrates this shroud to deliver emergency coolant water to the core in the event of an emergency involving a loss of coolant or where coolant is otherwise unavailable to the core.

As shown in FIG. 1, such piping includes core spray piping 10 and spargers used to deliver coolant water to the reactor core. The core spray cooling water is typically supplied to the reactor core region through a sparger T-box 15 that penetrates the shroud wall. The distal end of the T-box 15 is inside the shroud, while the proximal end extends outside the shroud.

The sparger T-box typically intersects two sparger pipes 10 to form a piping "T." The sparger pipes 10 are typically welded to the sparger T-box 15. The distal end of the T-box 15 may be capped by a flat cover plate 20 welded to the T-box 15. While only a lower sparger T-box 15 is shown in FIG. 1, upper sparger T-boxes are typically present as well and roughly match the configuration of the lower sparger T-box in the upper configuration. Lower T-boxes typically intersect sparger pipes 10 at a center vertical displacement such that the pipes 10 mate symmetrically with the upper and lower halves of the lower T-box 15. Upper sparger T-boxes may not intersect the sparger pipes 10 at a center vertical offset due to other structural placement and thus sparger pipes 10 may not symmetrically mate with the upper sparger T-box.

The cover plate weld 25 and sparger pipe welds 26 are susceptible to cracking due to the high temperature, high pressure, and variable chemistry water flowing around the T-box 15. Resulting damage to welds 25 and 26 may be accessible for repair and inspection within a BWR only during scheduled plant outages for refueling and repair. These outages typically occur at several month intervals, and thus components within the core, including welds 25 and 26, must remain intact for lengthy periods before being inspected and/or repaired.

Further, BWR core operating conditions include high levels of radioactivity due to fission occurring in the fuel rods. Radioactivity, particularly the neutron flux generated in an operating nuclear reactor core, degrades the material strength and elasticity of core components over time. Components within the core, including welds 25 and 26, are thus subject to premature brittling and cracking due to this radiation exposure. Accordingly, flow-induced vibration, lengthy operating cycles, and demanding water conditions coupled with radiation can cause the welds 25 and 26 to crack, particularly, by intergranular stress corrosion cracking. If cracks in welds 25 and 26 propagate circumferentially so as to completely disunion either the cover plate 20 or the sparger pipes 10 from the sparger T-box 15, uncontrolled cooling water leakage may result.

Further compounding the precarious nature of the sparger T-box welds 25 and 26 is their arrangement within the shroud among other components. Even during repair phases, workers may have only remote access to the sparger T-box 15 inside the shroud, and locating and repairing welds on the T-box may require increased expense, removal of other components, and worker hazards.

Related art sparger T-box repairs and clamps may use clamping mechanisms to relieve stress on welds 25 and 26 and provide redundant security in the case of weld failure. Sparger T-boxes 15 may have various physical configurations based on their particular plant installation and repair history. Related art repair mechanisms are generally configured for only a single sparger T-box in a particular BWR and are incompatible with other sparger T-boxes in other BWRs.

SUMMARY

Example embodiments are directed to core spray sparger T-box repairs, specifically, to universal core spray sparger T-box weldless clamps having remote-friendly operation and methods of using universal core spray sparger T-box weldless clamps. Example embodiment clamps may be secured without welding to a variety of upper and lower sparger T-box configurations. Example embodiment clamps may be configured to simultaneously engage a sparger T-box in multiple dimensions to allow a universal fit. Further, example embodiment clamps may be accessed, installed, or removed by interacting only with a front side of the example embodiment clamps, thus potentially reducing difficulty and cost in remote access repairs to example clamps.

BRIEF DESCRIPTIONS OF THE DRAWINGS

Example embodiments will become more apparent by describing, in detail, example embodiments thereof with reference to the attached drawings, wherein like elements are represented by like reference numerals, which are given by way of illustration only and thus do not limit the example embodiments herein.

DETAILED DESCRIPTION

Figure 1:
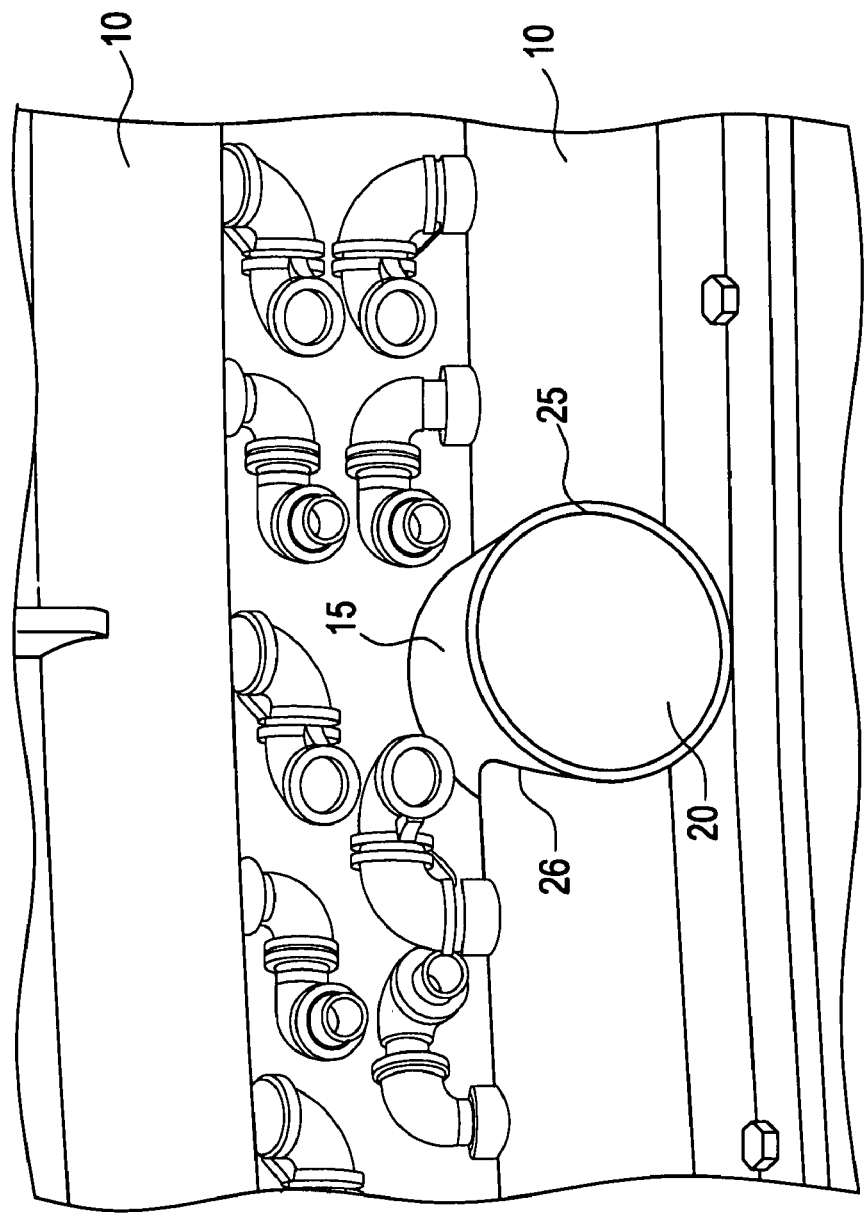
FIG. 1 is an illustration of related art BWR sparger pipes with a lower sparger T-box mated to the sparger pipes.
Figure 2:
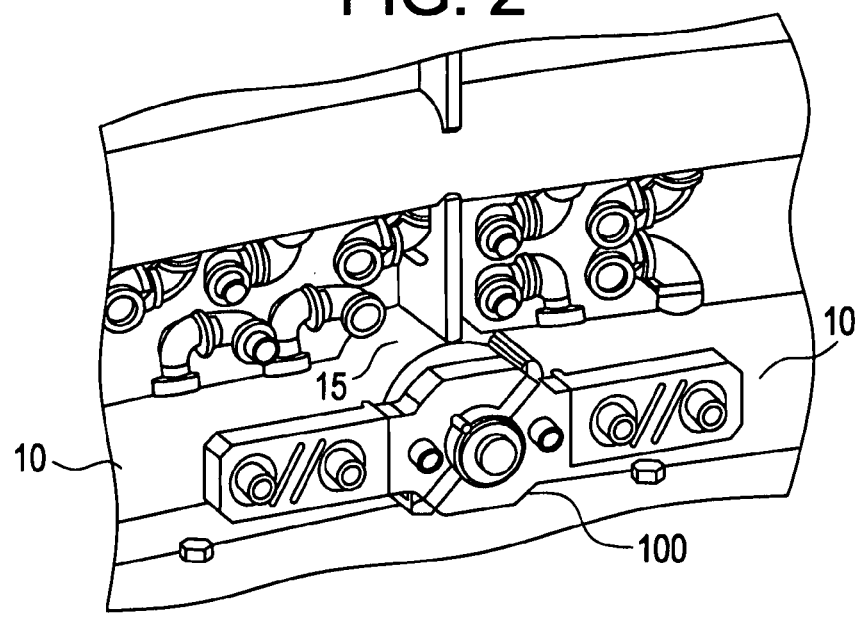
FIGS. 2 and 3 are isometric views of example embodiment core spray sparger T-box clamp assemblies installed on lower and upper sparger T-boxes, respectively.
Figure 3:
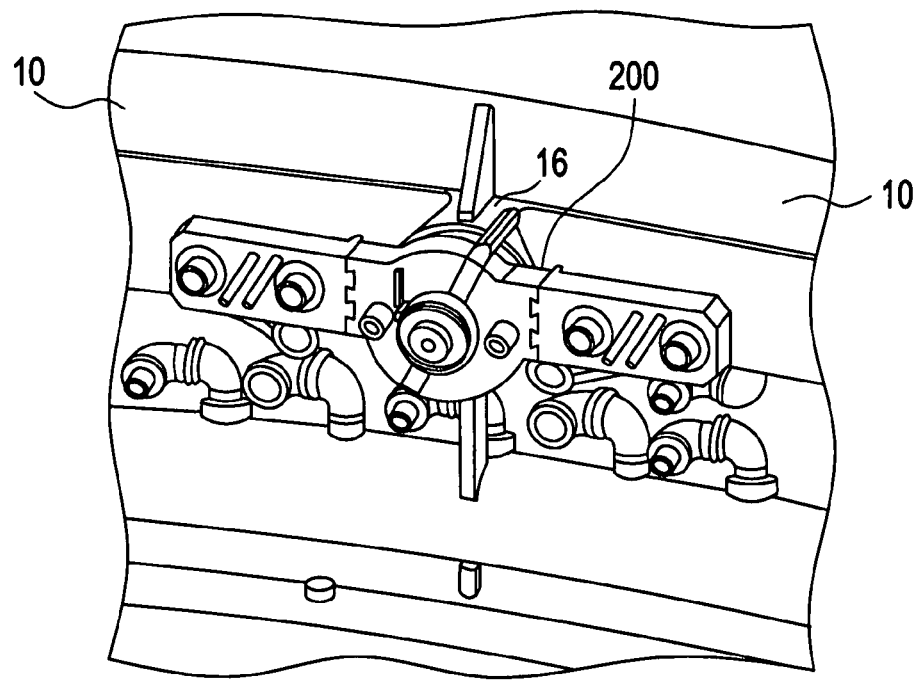

FIGS. 2 and 3 are isometric views of example embodiment core spray sparger T-box clamp assemblies 100 and 200 that may attach to the lower and upper sparger T-boxes 15 and 16, respectively, and sparger pipes 10 on either side of each sparger T-box. Example embodiment clamp assemblies 100 and 200 may reinforce and provide redundancy to the welds 25 and 26 (shown in FIG. 1) between the T-box and the cover plate and sparger pipes. The example embodiment clamp assemblies 100 and 200 may hold the pipes 10 and the cover plate 20 (shown in FIG. 1) to the sparger T-boxes 15 and 16 and thus relieve stress on welds 25 and 26 (shown in FIG. 1) and prevent or minimize coolant leakage from the welds 25 and 26 in the event of a full circumferential crack.

Example embodiments are described hereinafter with respect to the lower core spray sparger T-box clamp assembly 100. Upper clamp assembly 200 may have shared characteristics with the lower clamp assembly 100, and thus redundant descriptions are omitted.

Figure 4:
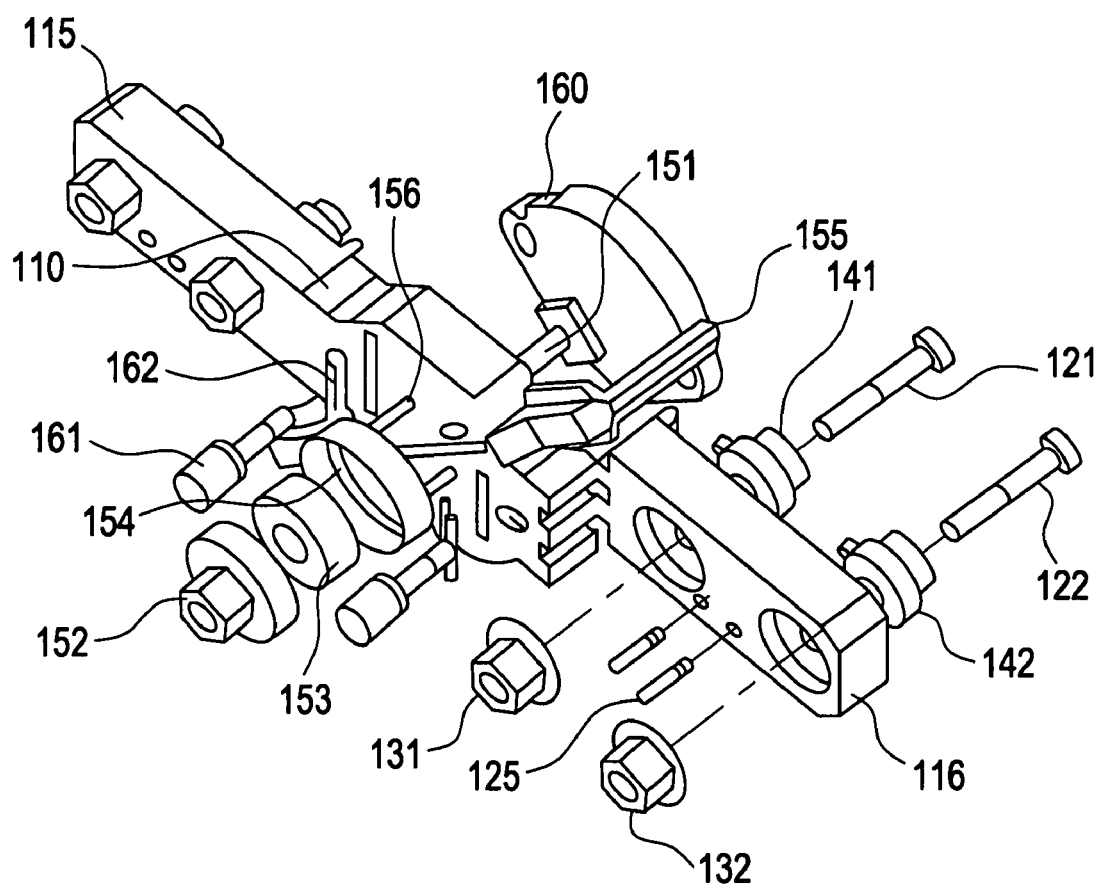
FIG. 4 is an exploded view of an example embodiment sparger T-box clamp assembly.

FIG. 4 is an exploded view of the example embodiment clamp assembly 100 in FIG. 2. As shown in FIG. 4, the example clamp assembly 100 includes an anchor plate 110 between two sparger pipe supports 115 and 116. The anchor plate 110 may be in front of the sparger T-box 15 (as shown in FIG. 2) and shaped to substantially match and cover and/or overlap the sparger T-box 15 and cover plate 20 (shown in FIG. 1). The sparger pipe supports 115 and 116 engage and support the left and right sparger pipes 10 on either side of the sparger T-box 15 via, for example, inner and outer T-bolts 121 and 122. The anchor plate 110 and sparger pipe supports 115 and 116 may be located in any relative position to match the configuration of various sparger T-boxes. For example, upper sparger T-boxes may be vertically offset from the sparger pipes 10, and the anchor plate 110 and sparger pipe supports 115 may be similarly offset to match the upper sparger T-box in that case.

The anchor plate 110 and sparger pipe supports 115 and 116 are connected by a dovetail joint that permits the sparger pipe supports 115 and 116 to translate relative to the anchor plate in an axial direction but prevents translation in a transverse direction along the length of the pipe supports 115 and 116. In this way, the anchor plate 110 and pipe supports 115 and 116 may be secured independently against the sparger T-box and sparger pipes, respectively. Further, the dovetail joints allow the anchor plate 110 and pipe supports 115 and 116 to be installed at different displacements in the axial direction to accommodate different sparger T-box and pipe configurations.

First described are example structures for attaching example embodiment clamps to the sparger pipes, specifically, for attaching the sparger supports 115 and 116 to the sparger pipes 10.

In an example embodiment, the sparger pipe supports 115 and 116 may be attached to the sparger pipes 10 by inner and outer T-bolts 121 and 122, which may be secured to the supports 115 and 116 by T-bolt nuts 131 and 132. The T-bolts 121 and 122 may extend through apertures 50 (shown in FIG. 12) created in the sparger pipes 10 by, for example, electric discharge machining. A threaded end of each T-bolt 121 and 122 may extend through the pipe support 116. Sealing collars 141 and 142 may interface with the sparger pipe around the aperture 50 in order to prevent leakage of coolant through the aperture 50. The T-bolt nuts 131 and 132 may screw onto the threaded ends of corresponding T-bolts 121 and 122. The head of each T-bolt 121 and 122 may have a keyed shape, for instance a rectangular shape, that allows the T-bolt to slide into a corresponding aperture 50. The T-bolt may then be rotated and thus locked in the sparger pipe 10.

Sealing collars 141 and 142 may be placed on the T-bolts 121 and 122 such that as the T-bolt nuts 131 and 132 are tightened, the collars 141 and 142 may be seated against the exterior curved surfaces of the sparger pipes 10. The sparger pipe support 115 and 116 may have recesses and holes to allow the T-bolts 121 and 122, T-bolt nuts 131 and 132, and sealing collars 141 and 142 to pass through the pipe supports 115 and 116 and/or seat against them.

Ratchet springs 125 may be placed into adjoining slots in the sparger pipe supports 115 and 116 to allow only one-way rotation of the T-bolt nuts 131 and 132. For example, ratchet springs 125 may allow only tightening of the T-bolt nuts 131 and 132. The ratchet springs 125 may be keyed to allow disengagement from the T-bolt nuts 131 and 132 and permit two-way rotation of the nuts 131 and 132. For example, the ratchet springs 125 may be keyed to disengage and allow removal of the sparger pipe supports 115 and 116.

Although example embodiments and example structures for attaching example embodiment clamps to sparger pipes have been described as having sparger pipe supports 115 and 116 joined to sparger pipes 10 through a T-bolt 121, T-bolt nut 131, and sealing collar 141, other fastening structures are useable with example embodiments. For example, the sparger pipe supports may be attached to the sparger pipes by welding and/or gripping fasteners around the circumference of a sparger pipe as would be known to one skilled in the art.

Second described is a unique example clamp for securing example embodiment clamp assemblies to sparger T-boxes of varying configurations.

Because example embodiment assembly clamp assemblies include dovetail joints that permit axial movement between the anchor plate 110 and sparger pipe supports 115 and 116, the anchor plate 110 is independently clamped to the sparger T-box. Sparger T-boxes may have variety of configurations and front plate structures, and example embodiments provide a unique universal, front-accessible clamping mechanism for attaching to sparger T-boxes despite diverse front and dimensional characteristics.

As shown in FIG. 4, example clamp assemblies include a central post 151, a ratchet nut 152, a slider wedge 153, a ratchet nut lock 154, a pair of slide latches 155, and/or four flat-head screws 156. These structures allow example embodiment clamp assemblies to engage a variety of sparger T-boxes securely and removably.

Figure 5:
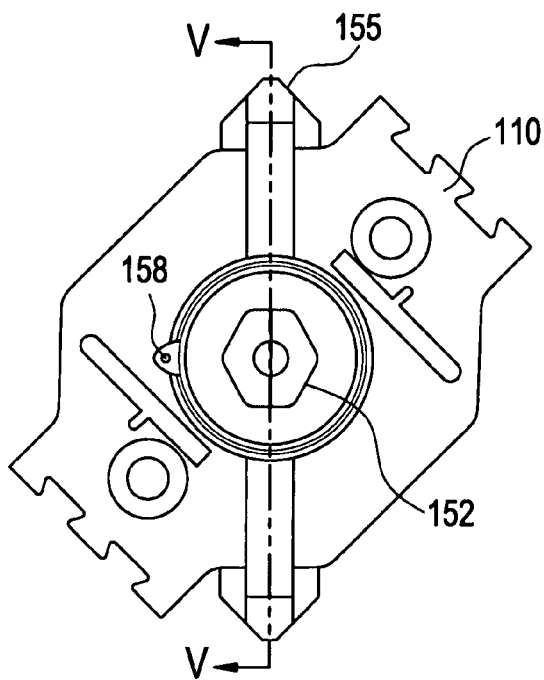
FIG. 5 is a front elevation view of the anchor plate and clamping structures.
Figure 6:
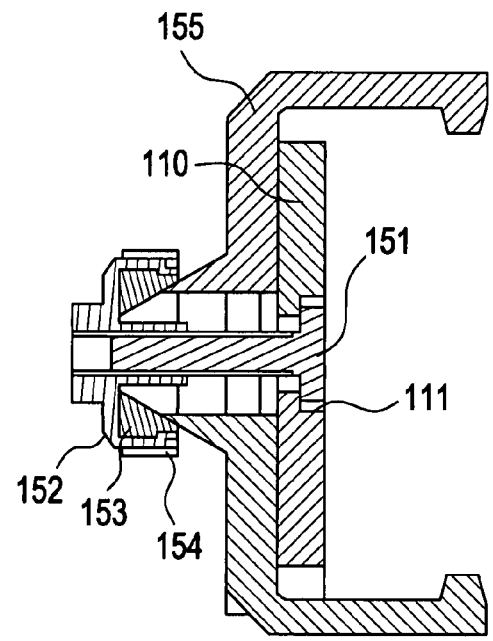
FIG. 6 is a cross-sectional view of an example embodiment anchor plate and clamping structures useable in example embodiment clamp assemblies.

FIGS. 5 and 6 illustrate the latching structures described in FIG. 4. FIG. 6 is a cross-section along the line V-V in FIG. 5. As shown in FIG. 6, the anchor plate 110 may have a rectangular recessed area 111 that accommodates a rectangular end of the central post 151. The central post 151 may be prevented from rotating within the recessed area 111 due to the rectangular shape. The recessed area 111, however, may permit the central post 151 to translate within the recessed area 111 and thus re-center the anchor plate 110 to accommodate irregular T-box geometries. Such accommodation is discussed below in greater detail.

The ratchet nut 152 and ratchet nut lock 154 are placed on the other end of the central post 151 opposite the rectangular end. The outer surface of the ratchet nut 152 engages the inner surface of the ratchet nut lock 154 so as to permit rotation of the ratchet nut 152 in one direction only. As the ratchet nut 152 rotates, its inner surface engages threads on the end of the central post 151, drawing the ratchet nut 152 along the central post 151 in an axial direction. For example, the ratchet nut lock 154 may permit rotation of the ratchet nut 151 only in a direction corresponding to the ratchet nut 151 tightening down onto the central post 151 axially.

The ratchet nut lock 154 may include a release 158, which may be a hole permitting a tool to be passed into it that disengages the ratchet nut lock 154 from the ratchet nut 152, allowing rotation of the ratchet nut 152 in any direction, including tightening and loosening along the central post 151.

The slider wedge 153 is within, but not completely confined by, the ratchet nut 152, and the central post 151 passes through the slider wedge 153. The slider wedge 153 is not rigidly attached to the ratchet nut 152. Instead, the slider wedge 153 and ratchet nut lock 154 are rigidly fixed together by, for example, flat-head screws 156 passing through the ratchet nut lock 154 and slider wedge 153. The slider wedge 153 and ratchet nut lock 154 may be held stationary by slide latches 155 that are mated with the stationary sparger T-box. In this way the ratchet nut 152 may rotate and move axially along the central post 151, but the ratchet nut lock 154 and slider wedge 153 translate only axially, and do not rotate, with the ratchet nut 152.

Figure 7:
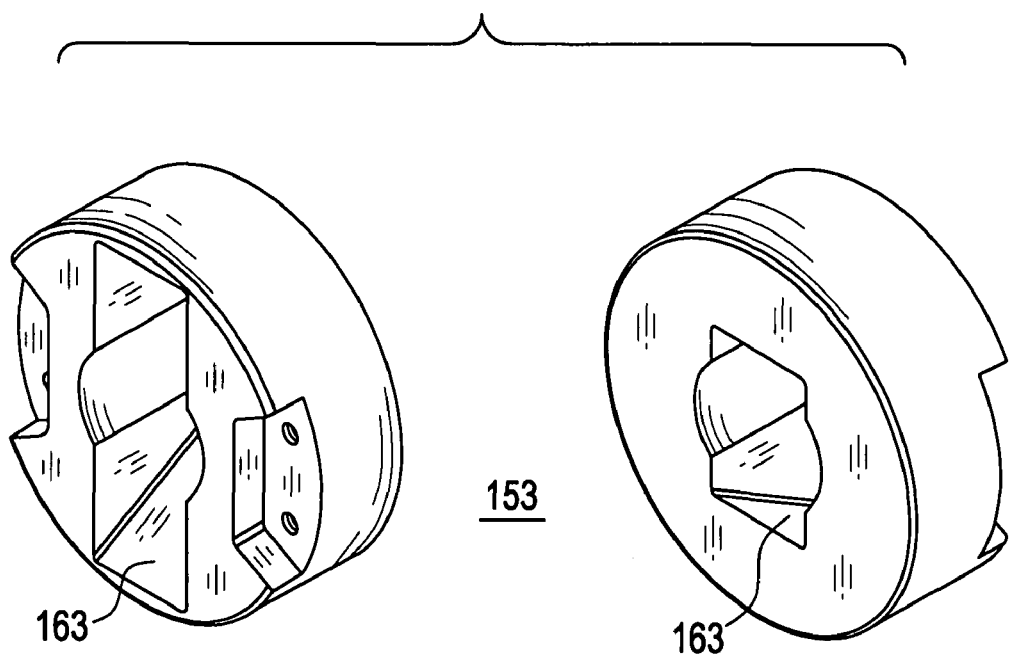
FIG. 7 is an isometric view of an example slider wedge useable in example embodiment clamps.
Figure 8:
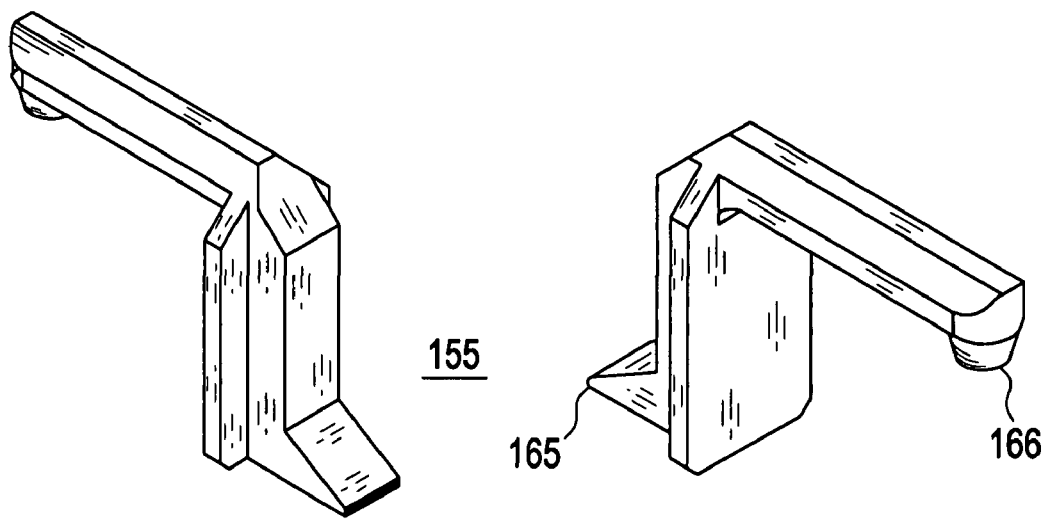
FIG. 8 is an isometric view of an example slide latch useable in example embodiment clamps.

FIG. 7 is an isometric view of a slider wedge 153 useable in example embodiments. FIG. 8 is an isometric view of slide latches 155 useable in example embodiments. As shown in FIG. 8, slide latches 155 may have an angled end 165 and a conical end 166. The angled end 165 may mate with the angled inner surface 163 of the slider wedge 153 shown in FIG. 7. As shown in FIG. 6, the angled ends 165 may fit within the angled inner surface 163 and prevent rotation of the slider wedge 153 as long as the slide latch 155 cannot rotate. As the slider wedge 153 is translated axially along the central post 151, the slide latches 155 may be drawn inward radially due to the mating of the angled inner surface 163 and the angled ends 165. As the conical ends 166 are held stationary and/or impeded from further radial movement, the slider wedge 153 may not move the slide latches 155 inward radially any further, and the slider wedge 153 and ratchet nut 152 may not be further tightened along the central post 151.

Figure 9:
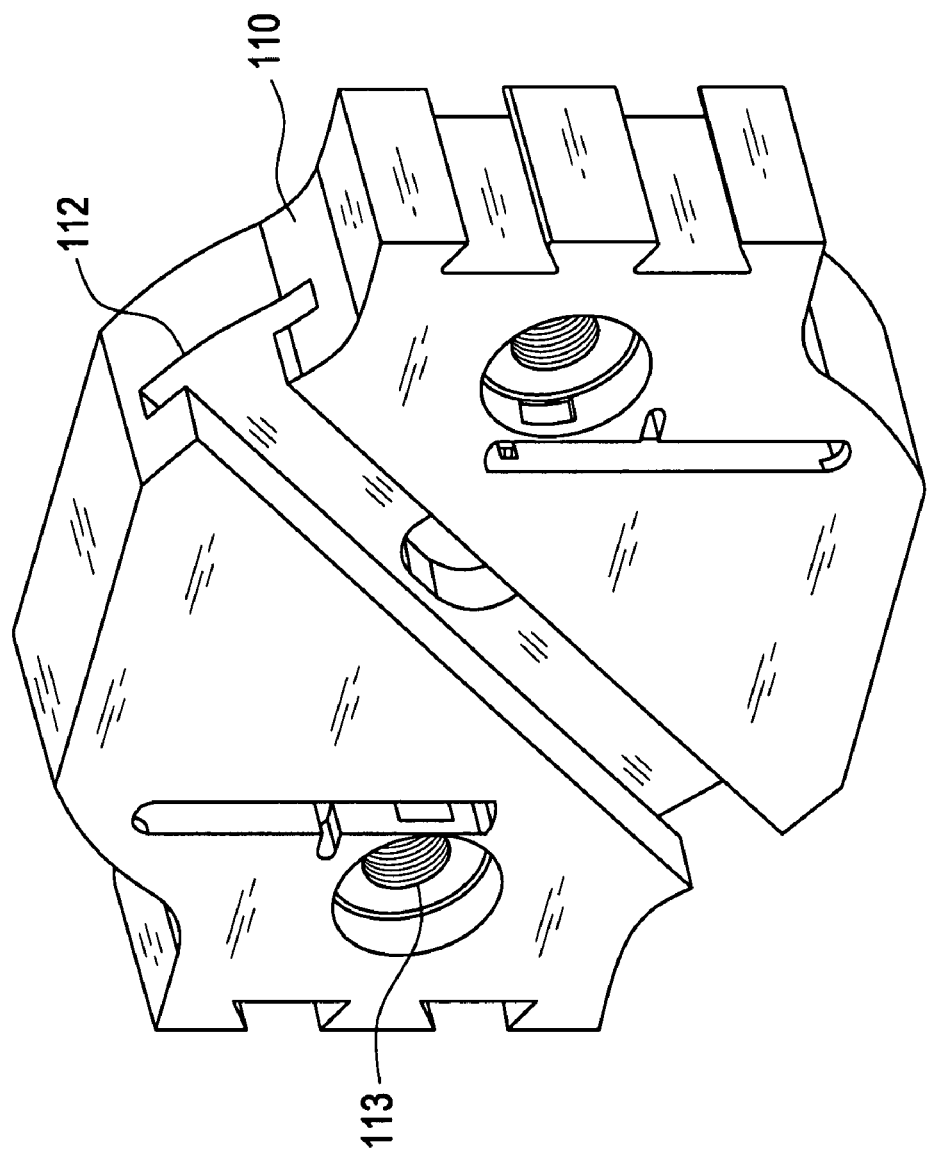
FIG. 9 is an isometric view of an example anchor plate useable in example embodiment clamps.

FIG. 9 shows the anchor plate 110 in greater detail, including a T-shaped slot 112 across the face of the anchor plate 110. The slot 112 allows the slide latches 155 to be fixed with the anchor plate 110 and prevents rotation of the slide latches 155, the ratchet nut lock 154, and/or slider wedge 153 to which the ratchet nut lock 154 is mated. The slot 112, however, permits the slide latches 155 to move radially inward and outward as they are tightened against the sparger T-box. Further, the direction of the slot 112 may match an orientation of the recessed area 111 on the opposite side of the anchor plate 110 (shown in FIGS. 5 and 6). In this way, the central post 151 may translate relative to the recessed area 111 only in a direction corresponding to the slot 112 direction and slide latch 155 orientation. Thus, if the anchor plate 110 and central post 151 are not initially centered between the exterior of a sparger T-box, the central post can translate due to clamping force from the slide latches 155 to a position centered between the slide latches 155. In this way example embodiment clamp assemblies may accommodate different or uneven outer geometries of sparger T-boxes without unevenly attaching to the sparger T-box.

Figure 10:
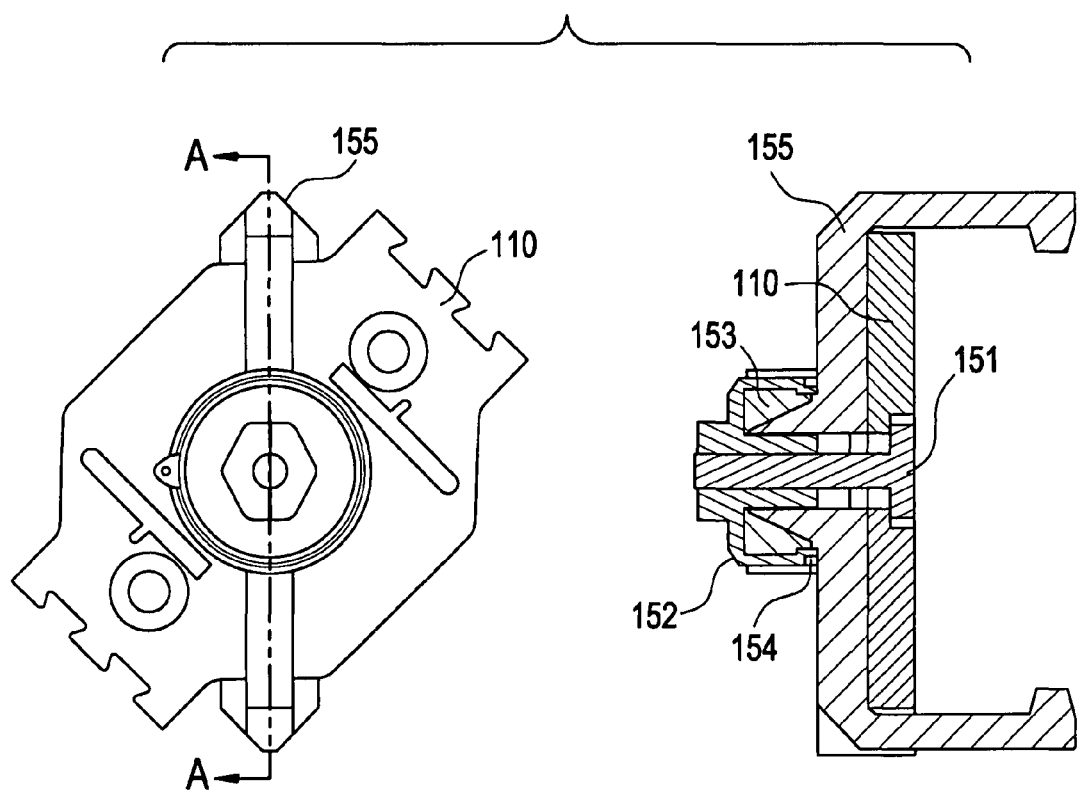
FIG. 10 is a front elevation and cross-sectional view of the example embodiment clamps in the installed configuration.

FIG. 10 shows the same example embodiment clamp assembly as FIGS. 5 and 6, but with the ratchet nut 152, ratchet nut lock 154, and slider wedge 153 advanced further axially along the central post 151. As shown in FIG. 10, the slide latches 155 have been drawn radially inward due to the axial translation of the slider wedge 153.

Figure 12:
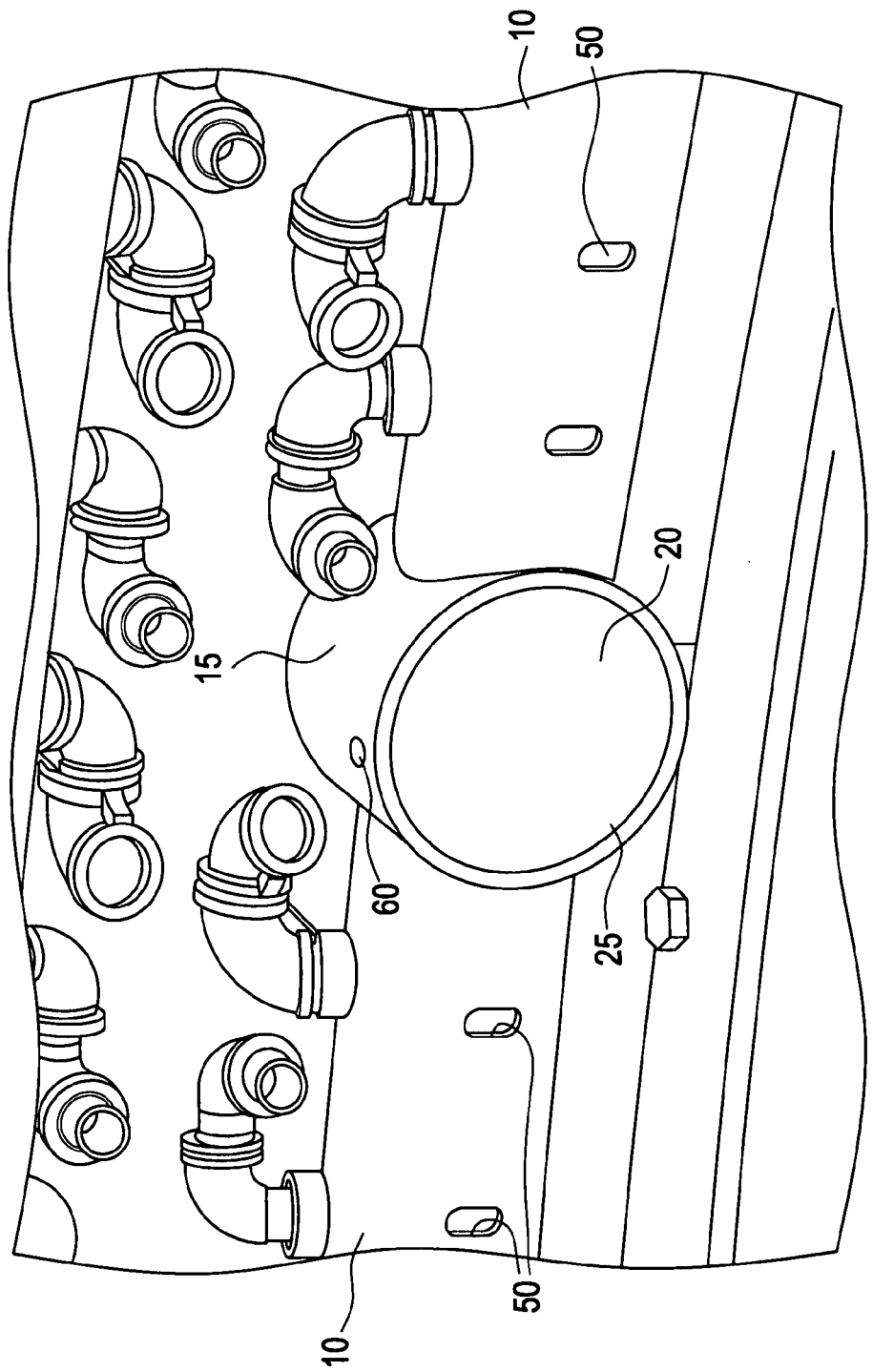
FIG. 12 is an illustration of BWR sparger pipes and T-box after forming slots and holes in accordance with example methods.

The conical end 166 of slide latch 155 may engage a hole 60 in the sparger T-box 15 (shown in FIG. 12). The hole 60 may be formed by any known method including, for example, electric discharge machining. Once the conical end 166 is fully seated into the hole 60, the latch may not be translated inward radially further, and tightening of the ratchet nut bolt may be impeded or stopped.

Example clamps for securing example embodiment clamp assemblies to sparger T-boxes of varying configurations having been described, it will be apparent to those skilled in the art that departure from these examples by routine experimentation to accommodate other configurations is possible. For example, the shape of ends 166 of slide latches 155 need not be conical or engage T-boxes in a single area; rather, any equivalent structure that allows the slide latches 155 to engage the sparger T-box may be substituted. Similarly, screws need not be used to secure the slider wedge to the ratchet nut lock and T-shaped slots are not required to prevent the slide latches from rotating. Rather, any structure for mating the slider wedge, ratchet nut lock, and slide latches may be implemented.

These example structures offer an example embodiment clamp assembly may be secured to the body of the sparger T-box of divergent configuration, and how installation and removal may be achieved through a single face-accessible nut structure.

Thirdly, example embodiment clamp assemblies may also include structures that seat against the cover plate 20 to provide support to weld 25 and prevent potential coolant leakage should weld 25 fail.

As shown in FIG. 4, example embodiment clamp assemblies may include a bearing plate 160, bearing plate bolts 161, and latch springs 162. The bearing plate 160 may be biased against the cover plate 20 and may secure the cover plate 20 in the event weld 25 fails. The bearing plate 160 may be connected to the anchor plate 110 by bearing plate bolts 161 that extend through threaded holes 113 in the anchor plate 110 (shown in FIG. 9). The bearing bolts 161 may rotate to move the bearing plate 160 toward the T-box cover plate 20. Latch springs 162 may lock the rotational position of the bearing plate bolts 161 to ensure that force applied to the cover plate 20 by the bearing plate 160 does not lessen over a prolonged operation period. The latch springs 162 may seat in respective slots on the face of the anchor plate 110 and may be disengaged by a key structure that disengages the latch springs 162 from the bolts 161 to allow rotation of the bolts in either direction.

Figure 11:
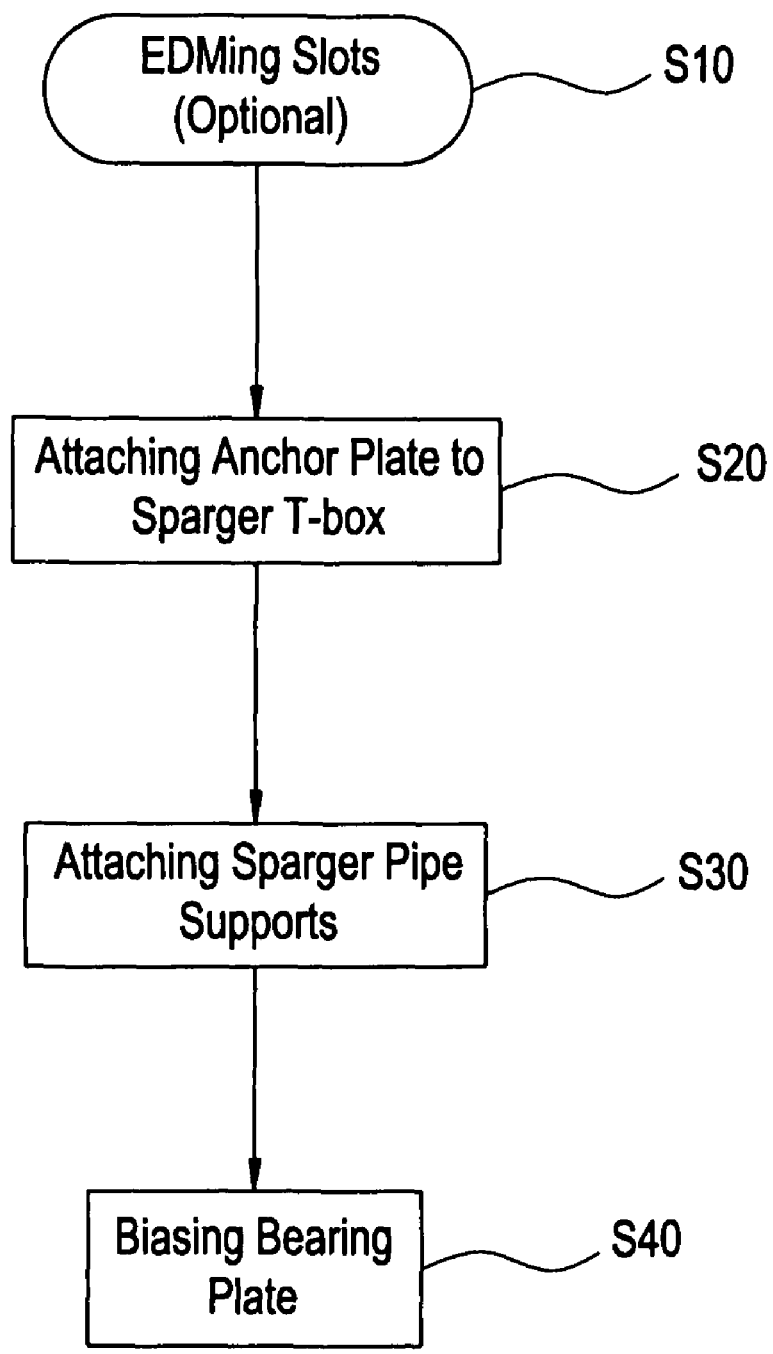
FIG. 11 is a flow chart of example methods for using a core spray sparger T-box clamp assembly.

Example methods for operating core spray sparger T-box clamp assemblies are described with reference to FIGS. 11 and 12. FIG. 11 is a flow chart of an example method for operating a core spray sparger T-box clamp. As shown in FIG. 11, in optional step S10, slots and holes may be formed in existing sparger pipes and sparger T-boxes. The slots and holes may be placed in any configuration so as to permit a clamp assembly to engage and clamp to sparger pipes and sparger T-boxes. For example, slots may be machined into the sparger pipes and holes may be machined into opposite sides of the sparger T-box. Any known process of forming these holes and slots may be used, including electric discharge machining.

FIG. 12 shows an example of step S10 with slots 50 and holes 60 machined into the sparger pipes 10 and sparger T-box 15, respectively.

As shown in step S20, an anchor plate may be clamped to the sparger T-box. Such clamping may be performed solely by rotational tightening on the face of the clamping mechanism and may accommodate a wide variety of sparger T-box configurations. The clamping may also center the clamping assembly between the clamped areas of the sparger T-box.

As shown in step S30, sparger pipe supports may be attached to the sparger pipes so as to secure the sparger pipe supports to the sparger pipes. The supports may secure the sparger pipes in transverse directions parallel to the supports only. Securing the sparger pipe supports may include tightening the sparger pipe supports on only the face of the sparger supports.

The clamp assembly may be secured against the sparger T-box cover by tightening on the face of the anchor plate. As such, all example methods require only access to the face of clamping assemblies in order to operate the clamping assemblies; however, access to other sides and/or aspects of clamping assemblies may be allowed by example methods.

As shown in step S40, a bearing plate may then be biased against a cover plate of the sparger T-box.

Example embodiments and methods thus being described, it will be appreciated by one skilled in the art that example embodiments and example methods may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A core spray sparger T-box clamp assembly for a sparger T-box in a nuclear reactor, the clamp assembly comprising:
   an anchor plate shaped to substantially align with a cover plate of the T-box;
   a clamp including a plurality of latches mated with the anchor plate, the clamp configured to connect and secure the anchor plate to the T-box via the latches the latches being directly connected to the t-box;
   at least one sparger pipe support configured to attach to sparger pipe adjoining the T-box, the sparger pipe rigidly connected to the anchor plate in at least one dimension; and
   a bearing plate extendably attached to the anchor plate, the bearing plate configured to seat against the cover plate of the T-box.

2. The clamp assembly of claim 1, wherein the clamp further includes a rotatable extension on a front face of the clamp assembly, the rotatable extension configured to tighten the clamp against the T-box via the latches when the rotatable extension is rotated.

3. The clamp assembly of claim 2, wherein the rotatable extension includes a ratchet nut, a ratchet nut lock, a slider wedge, and a central post.

4. The clamp assembly of claim 3, wherein the central post extends concentrically through the anchor plate, the ratchet nut, the ratchet nut lock, and the slider wedge, and wherein the slider wedge is nested within the ratchet nut and the ratchet nut is nested within the ratchet nut lock.

5. The clamp assembly of claim 3, wherein the ratchet nut lock is rigidly connected to the slider wedge, and wherein the ratchet nut lock engages the ratchet nut so as to permit rotation of the ratchet nut only in a single direction.

6. The clamp assembly of claim 1, wherein the latches engage opposite sides of the T-box and center the clamp and anchor plate between the opposite sides.

7. The clamp assembly of claim 1, wherein the anchor plate and the sparger pipe support are rigidly connected in only two perpendicular directions.

8. The clamp assembly of claim 7, wherein the anchor plate and the sparger pipe support are connected by a dovetail joint.

9. The clamp assembly of claim 1, wherein the sparger pipe support includes at least one T-bolt, at least one T-bolt nut, and at least one sealing collar.

10. The clamp assembly of claim 9, wherein the sparger pipe support is connected to the sparger pipe by the T-bolt, the T-bolt nut, and the sealing collar, the T-bolt extending through the sparger pipe support and into the sparger pipe.

11. The clamp assembly of claim 10, wherein the T-bolt nut is configured to be tightened from a front face of the clamp assembly.

12. A core spray sparger T-box clamp assembly for a sparger T-box in a nuclear reactor, the clamp assembly comprising:
    an anchor plate shaped to substantially align with a cover plate of the T-box;
    at least one sparger pipe support attached to sparger pipe adjoining the T-box, the sparger pipe rigidly connected to the anchor plate in at least one dimension;
    a bearing plate extendably attached to the anchor plate, the bearing plate, the plurality of latches directly connected to the t-box and configured to slide radially inward toward the anchor plate; and
    a clamp including a plurality of latches extending around the anchor plate and the bearing plate, the plurality of latches configured to slide radially inward toward the anchor plate as the clamp is tightened.

13. The clamp assembly of claim 12, wherein the anchor plate, the sparger pipe support, and the bearing plate are configured to be attached to or removed from one of the sparger T-box and the sparger pipes through a single face of the clamp assembly.

14. A core spray sparger T-box clamp assembly for a sparger T-box in a nuclear reactor, the clamp assembly comprising:
    an anchor plate;
    at least one sparger pipe support configured to attach to a sparger pipe adjoining the T-box, the sparger pipe support connected to the anchor plate;
    a bearing plate extendably attached to the anchor plate; and
    a clamp including a plurality of latches configured to engage directly with the T-box, the clamp urging the bearing plate against a cover plate of the T-box, the clamp being secured to the T-box by the latches so as to provide the urging.

15. The clamp assembly of claim 14, wherein the clamp includes a rotatable extension configured to tighten the clamp and further urge the bearing plate against the T-box.

16. The clamp assembly of claim 15, wherein the rotatable extension includes a ratchet nut, a ratchet nut lock, a slider wedge, and a central post.

17. The clamp assembly of claim 16, wherein the central post extends concentrically through the anchor plate, the ratchet nut, the ratchet nut lock, and the slider wedge, and wherein the slider wedge is nested within the ratchet nut and the ratchet nut is nested within the ratchet nut lock.

18. The clamp assembly of claim 16, wherein the ratchet nut lock is rigidly connected to the slider wedge, and wherein the ratchet nut lock engages the ratchet nut so as to permit rotation of the ratchet nut only in a single direction.

19. The clamp assembly of claim 14, wherein the latches extend around an outer edge of the anchor plate at equal and opposite intervals so as to engage opposite sides of the T-box.

20. The clamp assembly of claim 14, wherein the anchor plate and the sparger pipe support are rigidly connected in only two perpendicular directions.

* * * * *